US005841369A

United States Patent [19]

Sutton et al.

[11] Patent Number: 5,841,369

[45] Date of Patent: Nov. 24, 1998

[54] PARKING METER WITH PERIPHERAL FUNCTIONS

[75] Inventors: Joseph H. Sutton, Harrison, Ark.; Ralph H. Carmen, Merritt Island, Fla.; Gorm Tuxen, Antioch, Tenn.

[73] Assignee: Duncan Industries Parking Control Systems, Harrison, Ark.

[21] Appl. No.: 844,159

[22] Filed: Apr. 18, 1997

[51] Int. Cl.$^{6}$ .................................................. B60Q 1/48

[52] U.S. Cl. .................................. 34/932.2; 340/870.02; 379/106.01; 379/106.03; 179/205; 179/217

[58] Field of Search ............................ 340/932.2, 309.15, 340/870.02; 194/205, 217; 368/90; 379/106.01, 106.03

[56] References Cited

U.S. PATENT DOCUMENTS

| | | | |
|---|---|---|---|
| 4,379,334 | 4/1983 | Feagins, Jr. et al. | 364/467 |
| 5,103,957 | 4/1992 | Ng et al. | 194/217 |
| 5,222,076 | 6/1993 | Ng et al. | 375/9 |
| 5,442,348 | 8/1995 | Mushell | 340/932.2 |
| 5,614,892 | 3/1997 | Ward, II et al. | 340/870.02 |
| 5,710,743 | 1/1998 | Dee et al. | 340/932.2 |

*Primary Examiner*—Jeffery A. Hofsass
*Assistant Examiner*—Sihong Huang
*Attorney, Agent, or Firm*—Rudnick & Wolfe

[57] ABSTRACT

A parking meter construction having an upper and lower housing with payment means for receiving coins or a payment card. A microprocessor and other electronic components are included on a PC board mounted in the upper housing. A modular jack is connected to terminals of the microprocessor for communication therewith, and the jack is supported in the meter for connection with any of a large variety of peripheral devices which can then utilize the microprocessor in their operation. A plurality of peripheral devices may be linked together and all kept in communication with the microprocessor.

10 Claims, 4 Drawing Sheets

PARKING METER WITH PERIPHERAL FUNCTIONS

This invention relates to an improved parking meter construction. In particular, the product of the invention involves the use of a local bus interface associated with peripheral devices. Such peripheral devices may have a large variety of functions such as enabling traffic studies, detecting the presence or absence of parked vehicles, or turning lights in the neighborhood of the meter on or off, or an external security application module for smart card authentication, or to equip the meter with an alternative form of payment device such as a non-contact smart card reader or bill acceptor, or to equip the meter with a receipt printer or coin return mechanism.

BACKGROUND OF THE INVENTION

Particularly since the advent of electronic parking meters, the meters have been designed for performing functions beyond just the purchase of parking time. Vehicle presence detectors have been designed which will wipe excess time off a meter after the vehicle has left the parking space. Means for recording the amount of coins deposited, and for recording the frequency of meter use at different times of the day, have also been utilized.

In such prior art systems, a microprocessor may be employed as part of the meter mechanism. By programming the microprocessor to achieve the desired result, and by providing a self-contained power source, such as a battery, the meter will perform the desired functions.

In such systems, the functions to be performed are built into the meter at the time of manufacture. For example, programs for operating a microprocessor, and the necessary componetry for implementation, are typically included as part of the manufacturing operation. If some new function is desired, the meter mechanism would typically be replaced in the meter with a new mechanism.

Temporary external access to the microprocessor of a mechanism has been provided. For example, communication has been established by plugging in an external device or by providing infrared transmission between the device and the microprocessor. The communication may be utilized for retrieving data from the meter, such as revenue input and time of use. The external device may also be used to input data to, for example, reprogram the meter to change the parking rate.

Vehicle presence sensors have also been associated with parking meters. These sensors are activated when the vehicle parked in a given space is moved out of the space and this will cause the meter to "wipe out" any remainder of the time purchased. This will increase revenue because the next driver using the space must purchase time to avoid a violation.

SUMMARY OF THE INVENTION

In accordance with this invention, the versatility of a parking meter is increased with the addition of a local bus interface. This interface is used for enabling peripheral devices to perform functions independent of the meter operation, and to impact meter operation.

The peripheral port may act as a data communications interface for purposes of accessing or retrieving data from the meter, or to reprogram all or part of the meter's memory. In addition, the peripheral port also serves as a means to interface with and implement the meter drive with respect to peripheral devices sharing both operating instructions and data.

The local bus interface takes the form of a telephone jack with a four wire interface. The signals involved comprise "Talk" which is used when data transmission is underway, "Listen" when data transmission is permitted, "Data" and "Ground". The utilization of this interface depends on the occurrence of some external event which will drive the system from the Listen to the Talk state. The transmission then occurring will cause the execution of a program to carry out a desired function.

The function to be carried out may, for example, involve turning on the lights of a tennis court. In this case, the tennis player would make a prescribed payment to the meter and this would be recognized. A signal is then sent to a relay, for example, which will close a switch connecting the court lights to line power. When the time purchased has expired, another signal will be sent to the relay to open the switch.

In similar fashion, the local bus interface may be utilized to facilitate the use of a vehicle sensor associated with the meter. By plugging the sensor into the jack, the Listen state will be utilized to determine whether the sensor has recognized a change from the standpoint of vehicle presence or absence. When so recognized, the Talk state will enable a signal to the meter program and will adjust the timer accordingly.

Modern parking meters are now being equipped with smart card reader devices to allow the use of a memory card or microprocessor card as a means of payment. Some of these cards require the use of a "security application module" to authenticate the payment transaction to validate that the transaction is legitimate from both the point of view of the meter and the card. In some applications, it is necessary to maintain the capability to update or replace the security application module, and/or to store records of the individual transactions so that electronic funds transfer processing may be completed. The security application module can be designed to plug into the peripheral interface of this invention so that custom modules may be employed with standard meters.

The peripheral interface also allows the parking meter mechanism to be interfaced with other external devices such as a bill acceptor, receipt printer, or coin return mechanism to enhance the versatility of the meter.

Peripheral devices can be constructed such that the signals are "daisy-chained" from one peripheral device to the next. This allows one meter mechanism to interface with multiple peripheral devices, for example, a smart card security application module and a coin return mechanism and an external bill acceptor, and a receipt printer. It is also possible for peripheral devices connected in this manner to interface with each other to perform combinations of tasks independently of the parking meter.

DESCRIPTION OF THE PREFERRED EMBODIMENT

Figure 1:
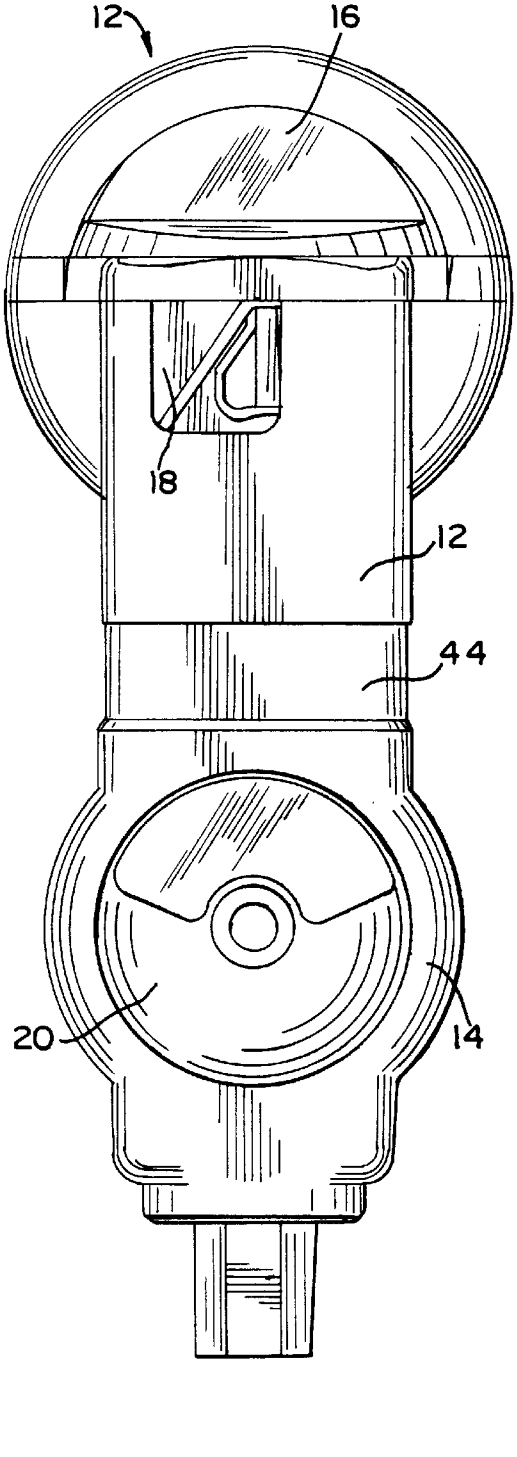
FIG. 1 is a front elevational view of a parking meter of the type suitable for implementation of the invention.
Figure 2:
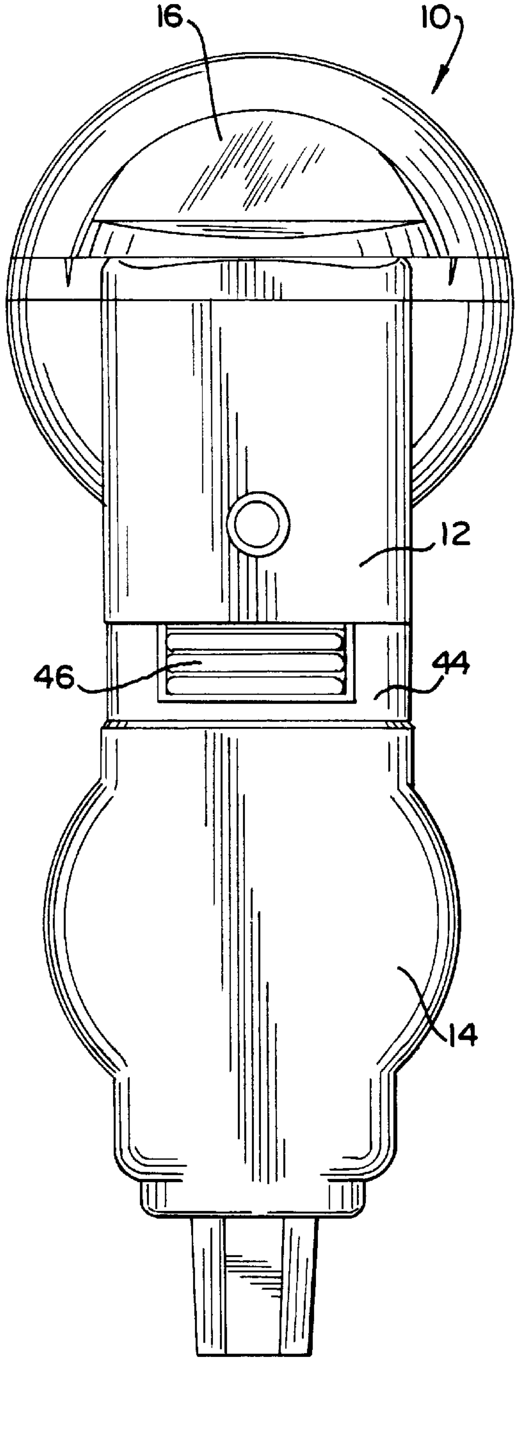
FIG. 2 is a rear elevational view of the meter of FIG. 1.
Figure 3:
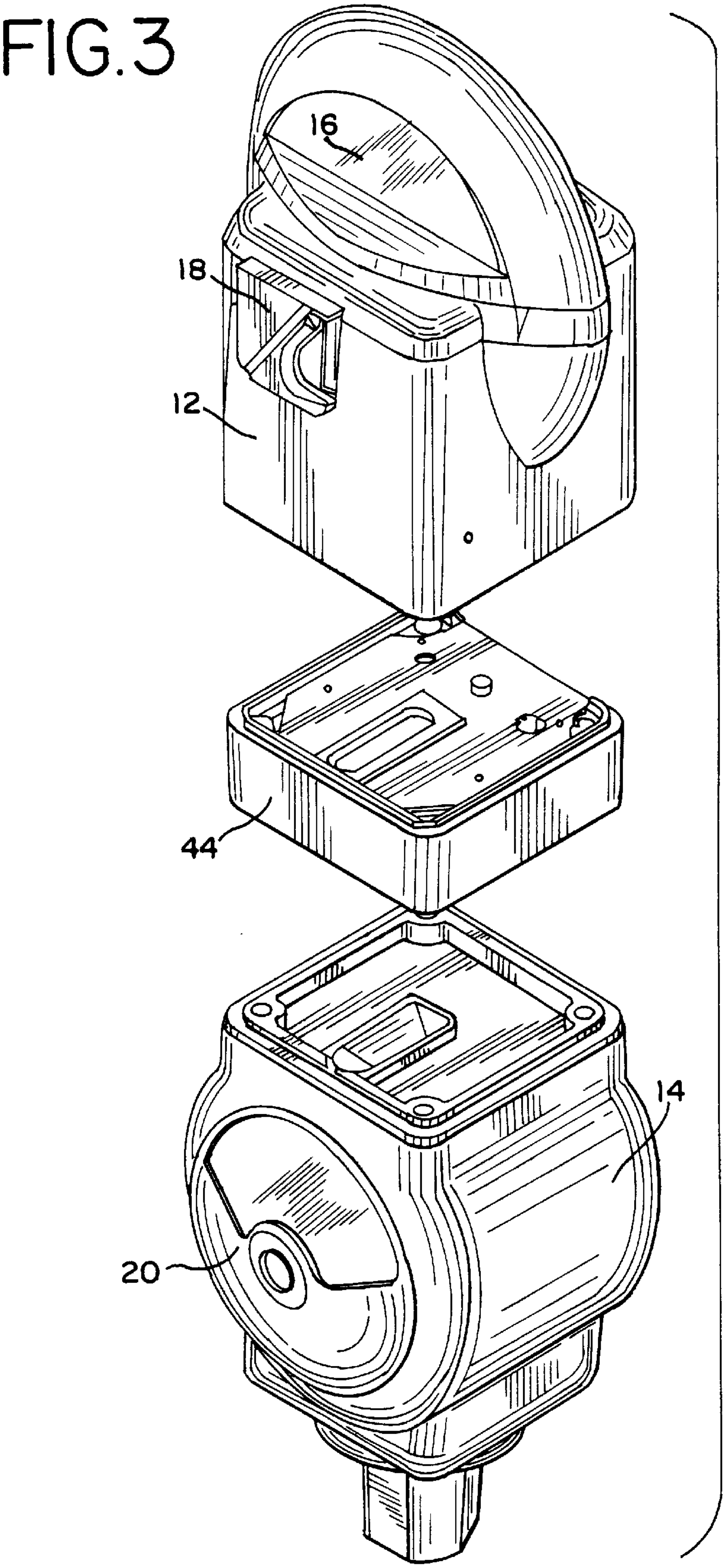
FIG. 3 is an exploded view in perspective of the meter of FIG. 1.

FIGS. 1–3 illustrate a parking meter 10 consisting of an upper housing 12 and lower housing 14. The upper housing defines display window 16 and a payment means 18 which may accommodate coins, tokens, debit cards, and the like located on one side of the housing. The lower housing is designed to hold a cash box and security door 20 is provided for access thereto.

Figure 4:
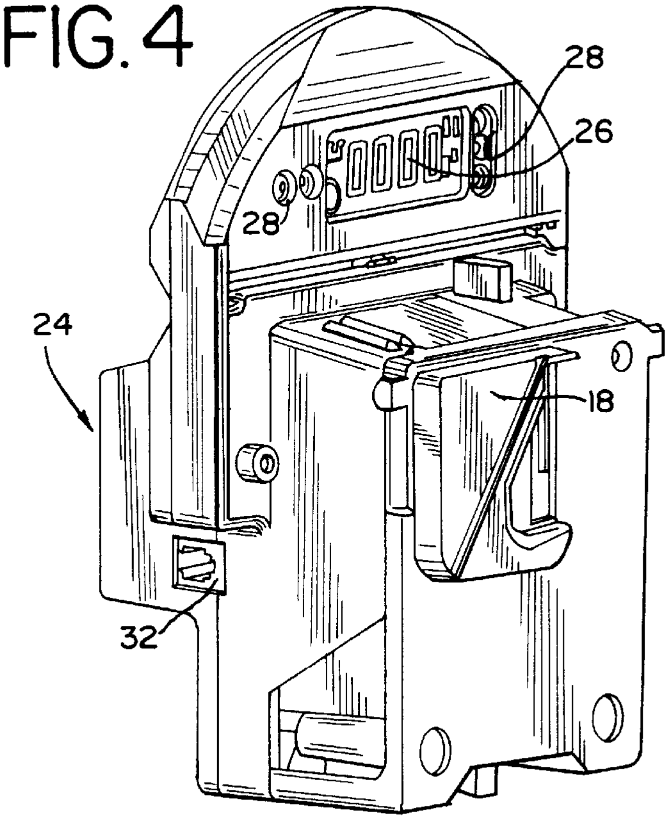
FIG. 4 is a perspective view of a mechanism mountable within the upper housing of the meter of FIG. 1.

The top of upper housing 12 is removable to permit installation of a mechanism 24 of the type illustrated in FIG. 4. This mechanism includes the payment means 18 and also includes a digital display 26 which is visible through window 16. Apertures 28 are formed in an upper face of the mechanism to permit infrared communication. The digital display and these communication functions, as well as other standard meter functions, are controlled by a microprocessor mounted on a PC board located in the mechanism interior.

Figure 5:
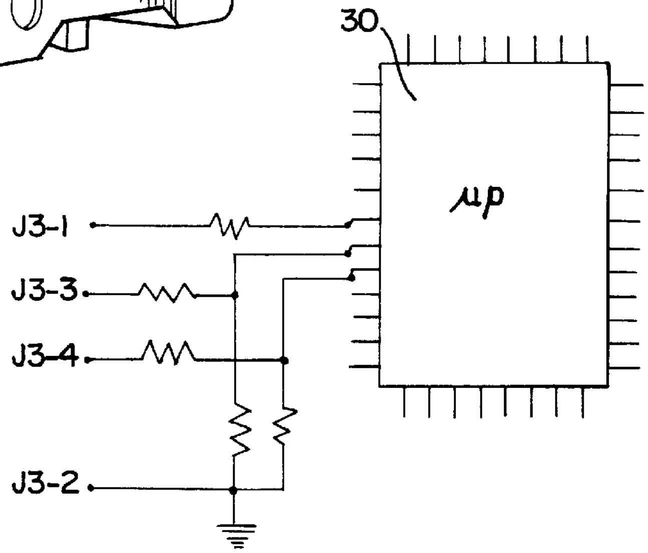
FIG. 5 is a schematic illustration of a microprocessor adapted to be included in the mechanism of FIG. 4 and illustrates peripheral port connections.

The microprocessor 30 shown in FIG. 5 includes a plurality of connection locations for, for example, controlling the operation of an LCD display, timers, light emitting diodes, etc. In accordance with this invention, connections J3-1 through J3-4 are provided to achieve a local bus interface. These connections are preferably made to a modular jack 32 as shown in FIG. 4.

The modular jack, also referred to as a local bus interface, may be used by peripheral devices for various purposes some unrelated to the meter's parking control function and some related to that function. It comprises a four wire interface consisting of the following signals:

Talk (means data transmission is underway)

Listen (means data transmission is permitted)

Data

Ground

There am two modes defied for the local bus:

Meter Mode (meter is conversing with meter peripherals)

Programming mode (meter is conversing with data terminal)

In the meter mode, data transmission occurs, for example, at 1170 bits per second. Format is 1 start bit, 8 data bits, 2 stop bits. Start bit is 0 volts, stop bit is 3 volts.

In the meter mode there are three bus states. These will be described in terms of an operating example but, of course, variations in detail are contemplated.

1. Passive state:

Meter holds Listen (J3-1) at Ground potential and Data (J3-4) and Talk (J3-3) at Ground through resistive terminations as shown in FIG. 5.

2. Listen state (meter is polling to see if any peripheral wants to converse):

Meter sets Listen to 3 volts. Any peripheral wishing to converse must respond by driving Talk and Data to 3 volts within 100 microseconds, otherwise meter ends polling attempt by returning Listen to Ground potential. Some external event, such as departure of a vehicle, will cause a peripheral to converse.

If peripheral drives Talk high in response to Listen, it must delay 2 milliseconds prior to beginning transmission to permit session setup. If peripheral fails to transmit within 50 milliseconds, meter ends polling attempt by returning Listen to Ground potential.

If Talk returns low during a message transmission, the session ends and Listen is returned to Ground potential. Talk will normally be returned to Ground potential during transmission of the last character of a session.

3. Talk state (meter wants to converse with peripheral):

Meter sets Talk to 3 volts, delays 1 millisecond to permit session setup by peripherals, and then transmits message. On completion, Talk and Data are returned to Ground potential.

If a peripheral has a message pending and Talk is asserted, the message must be held pending while the peripheral handles the incoming message.

Figure 7:
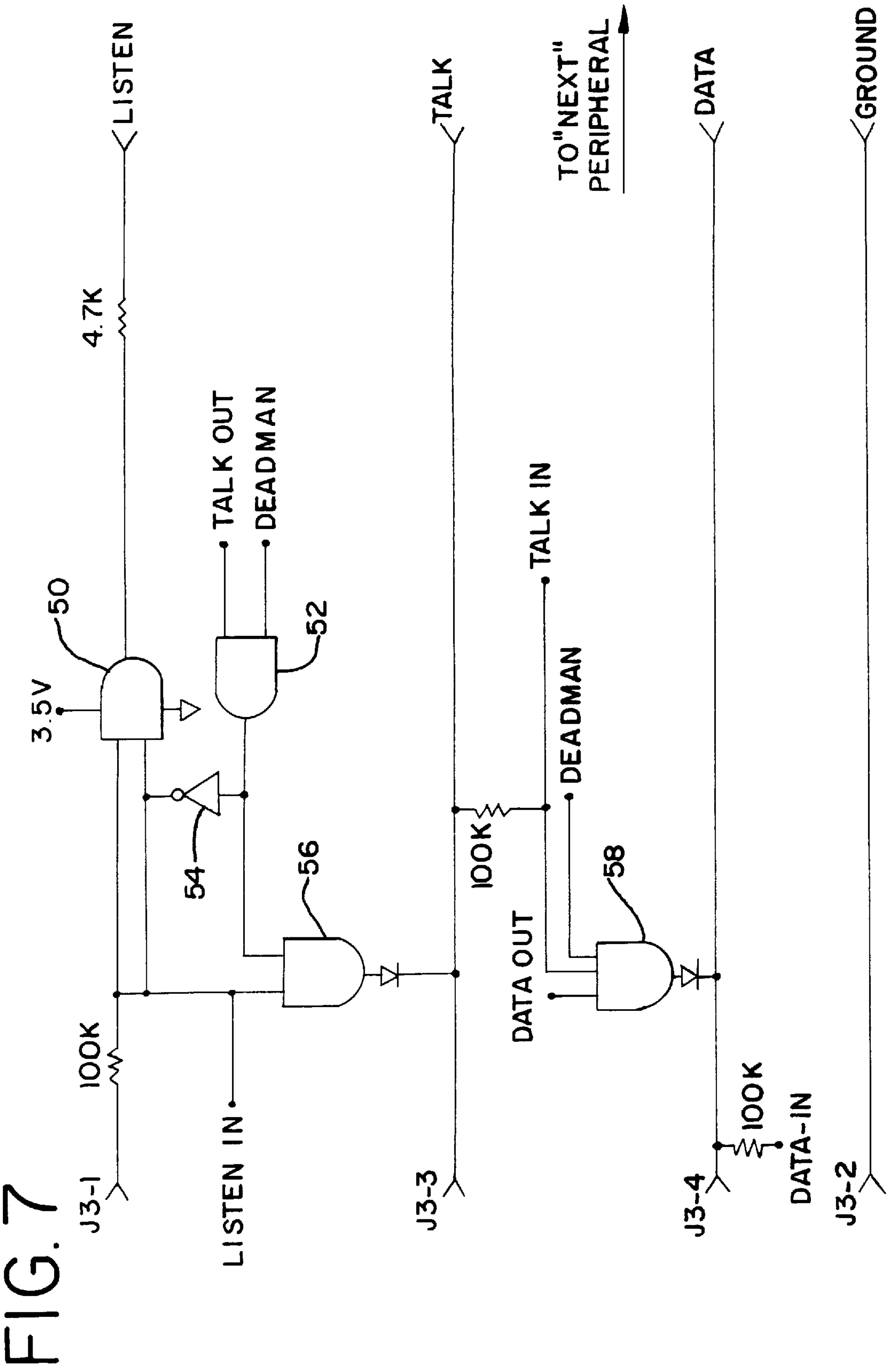
FIG. 7 is a more detailed schematic view of the peripheral circuitry.

The invention contemplates a plurality of peripherals connected to the local bus interface. To avoid network collisions, peripherals will daisy chain the Listen signal as shown in FIG. 7 with one or more additional modular jacks, as depicted diagrammatically at the right hand side of FIG. 7, being provided. Peripherals closer to the meter along the transmission cable will block Listen from reaching those peripherals further along the cable when making a message transmission attempt and maintain this blocking for the full duration of the communication session (until Listen returns low). Also, transmission attempts will only be made on high to low Listen signal transitions thus avoiding simultaneous attempt chain failure.

Blocking of the Listen signal in no way releases peripherals from receiving any message transmitted. Any message sent, the start of which is detected by the Talk line going high, must be received.

The Talk signal must not be set high by any peripheral while the Listen signal to the peripheral is at Ground potential. And, no Data can be sent by any device not involved in a communication session.

In query type communications, for example, where meter wants data from a peripheral or visa versa, the function initiating the query will maintain the Talk signal at 3 volts for the duration of the session. Such a communication could involve numerous situations, for example, where a peripheral device is monitoring meter activity and needs information from the mechanism regarding whether a coin or card was used to purchase time. Data link turnaround during queries will be via character oriented handshake.

FIG. 7 illustrates AND gate 50 which is included in the Listen transmission line. The output of this line (LISTEN) will extend to the jack for the next peripheral. When Listen is at 3 volts, and if a peripheral such as a vehicle sensor has a message, then TALKOUT is driven to 3 volts. Since DEADMAN (to be explained) is ordinarily maintained at 3 volts, the AND gate 52 applies a signal to inverter 54 preventing transmission along the Listen line to the next peripheral.

The signal through gate 52 is also applied to AND gate 56 and, since LISTEN IN is also high, a signal is applied through the gate to the Talk line J3-3. The peripheral with the message also drives TALK IN high which results in a signal from AND gate 58 to the Data line J3-4 and back to the microprocessor.

Where the peripheral is a vehicle sensor, the message will be translated as the movement of the vehicle from the parking space and the related program will cause the meter to reset to the maximum negative time.

Each peripheral is preferably in communication with the DEADMAN lines of AND gates 52 and 58 and this line is ordinarily maintained high permitting transmission through the gates. A peripheral program will detect a peripheral malfunction and can be caused to drive these lines low thereby disenabling these gates and, in effect, shutting down the peripheral function.

The intention of the above protocol is to permit peripherals to use the Talk signal as an interrupt input so that if a given message is initially determined to be irrelevant the peripheral can return to "normal" duties until the next low to high transition of Talk. If the mechanism determines that an inter-peripheral message is irrelevant, it will leave Listen high and return to its duties until Talk returns low at which time Listen will be returned to Ground potential and polling will resume.

It is anticipated that polling will occur at 0.5 second intervals.

There are a number of predefined local bus messages which may be employed, for example as follows:

Local bus output message definitions from meter to all peripherals:

reset:=0; hard reset
paid:=1; parking time –0:00 >xx:xx
expired:=2; parking time 00:01 >—0:00
grace:=3; end of grace period
excess:=4; end of excess period
penalty:=5; end of penalty period (stop clock)
tamper:=6; coin on a string
mem:=16; memory error
coin:=17; coin sensor error
batd:=18; dead battery error
wake:=19; wakeup coil jam
jam:=20; coin jam
batl:=21; low battery
dk:=22, data key error
park:=32; entering paid parking time
nopark:=33; entering noparking time
free:=34; entering free parking time
pre:=35; entering prepay parking time
iron:=48; infrared communications on
iroff:=49; infrared communications off Examples of local bus input message definitions (from peripherals to meter):

settime:=128,mm,hh; set meter time to hh:mm
time:=130,tt,vv; add time and value to meter In the programming mode:

If during Meter mode polling the Talk signal is found to be high to the meter prior to assertion of the Listen signal, the meter will enter programming mode using a 5 volt supply at 19.2 kbs.

Commands available in programming mode include:

Read meter memory

Write meter memory

Audit meter

Set meter real time clock

Add time and value to meter

Figure 6:
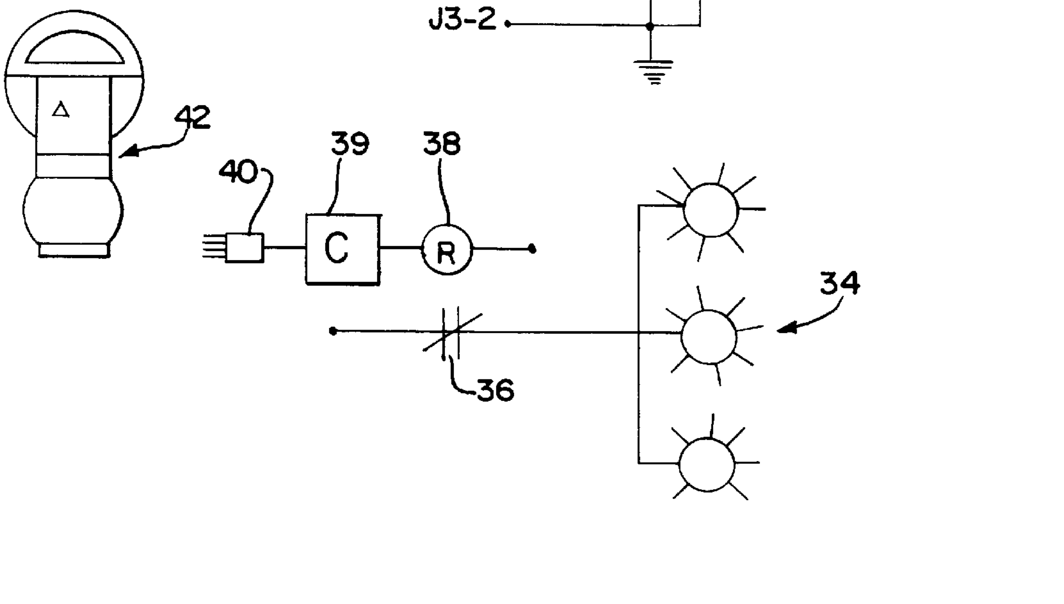
FIG. 6 is a schematic illustration of an example of the peripheral circuitry.

FIG. 6 illustrates application of the invention to a peripheral device including a bank of lights 34. The lights are connected to a source of power through switch 36, and relay 38 with a relay controller 39 operates to control this switch. The relay is connected to plug 40 which is receivable by a modular jack associated with meter 42. The plug 40 is preferably confined within the meter housing and the transmission lines from the plug may extend within the housing and even within a stanchion supporting the housing for maximum security.

When a coin is inserted in the meter, the local bus output message "paid" will be recognized during polling. This will result in a signal directly through the Data line to relay controller 39 turning on the lights. In addition, the program for this peripheral will set the timer for the prescribed period. When time expires, the polling will recognize the local bus output message "expired." Again this will result in a signal to the relay controller for turning off the lights.

Another embodiment of the invention is illustrated, in part, in FIGS. 1–3. Here a "biscuit" 44 is inserted between the upper and lower housings. This structure comprises a vehicle presence sensor using, for example, light emitting diodes positioned adjacent window 46. A local bus output message such as "paid" will be used when a vehicle arrives and the proper payment made. When the vehicle leaves, the sensor will initiate the local bus "Settime" message thereby resetting the meter to an expired condition.

The system of the invention allows for a constant expansion of devices that can be interfaced with the meter and added at a parking meter location. These devices and interfaces will allow for an increase in the type of data that can be collected relative to events at the location, and allow for operational changes at the location.

The communications capability of the system allows building of an interface linking a plurality of parking meters to a central data gathering point. For example, wireless communications may be established with the parking meter through the local bus interface, using programming at the meter location. Cabled communications with the parking meter may alternatively be established through the local bus interface, using hard wiring to access data collected or change programming at the meter location.

A vehicle presence sensor, when used, will allow for collection of a host of data for traffic studies at the meter location i.e. actual occupancy, paid occupancy, location traffic turnover, meter violations, etc. The sensor can also be used to grant the parking public up front grace time to allow the parker to get change and/or be used to eliminate remaining time on the meter when a vehicle departs a parking space.

A peripheral device may allow for the automatic transfer of all data collected at the parking locations to a memory device residing on the meter coin collection can. The data would automatically be transferred to a central data collection point through a series of data collection events as the coin can is emptied into the coin collection canister and the canister is emptied at the coin collection facility.

Other possibilities include:

1-A A peripheral device that facilitates the contactless data interchange with a debit card or other device, that can be used for electronic payment.

2. A peripheral device that allows for expansion of the electronic meter's internal memory outside the meter itself.

3. A peripheral device that allows the meter to control the timed dispensing of power to activate other mechanisms such as car washes and electric car charging stations.

It will be understood that various changes and additions may be made in the practice of this invention without departing from the spirit of the invention particularly as defined in the following claims.

Which is claimed:

1. In a parking meter construction having a housing, a meter mechanism supported within the housing, a card or coin receiver to initiate meter operation, a microprocessor for controlling the parking time operation, and an interface accessible from the meter exterior by means of a portable electronic unit for communication between the unit and the microprocessor, the improvement comprising a peripheral port comprising a connector mounted on the mechanism and serving as a local bus interface separate and independent of the first-mentioned interface, said local bus interface being connected to the mircoprocessor whereby messages can be transmitted through the peripheral port to and from the microprocessor, transmission lines connected to the peripheral port, and at least one external device connected to the transmission lines, said external device performing a designated function, said transmission lines including a data line for transmitting a signal to said microprocessor that an event has occurred to thereby enable said microprocessor to initiate an on-line function either in the meter or in the external device.

2. In a parking meter construction according to claim 1 the improvement including a listen line for polling to determine if the event has occurred, and a talk line enabling data transmission on the data line.

3. In a parking meter construction according to claim 2 the improvement wherein a four wire transmission line including said listen line, said talk line and said data line is employed and wherein the fourth transmission line is connected to ground.

4. In a parking meter construction according to claim 3 the improvement wherein said peripheral port consists of a modular jack, and a plug at the end of said four wire transmission line for connection to said port.

5. In a parking meter construction according to claim 3 the improvement including at least one additional external device connected in series with the first-mentioned external device, and including means to block transmission to the microprocessor further along said listen line until the transmission relating to said first mentioned external device is completed.

6. In a parking meter construction according to claim 3 the improvement including polling means controlled by said microprocessor for sending a signal through said listen line at periodic intervals to determine if the event has occurred.

7. In a method for operating a parking meter construction, said construction including a housing, a meter mechanism supported within the housing, a card or coin receiver to initiate meter operation, a microprocessor for controlling the meter parking time operation, and an interface accessible from the meter exterior by means of a portable electronic unit for communication between the unit and the microprocessor, the improvement comprising the steps of providing a peripheral port comprising a connector mounted on the mechanism for serving as a local bus interface connected to the microprocessor, said local bus interface being separate and independent of the first-mentioned interface, transmission lines connected to the peripheral port, and at least one external device connected to the transmission lines, said external device performing a designated function, the method for operating including the steps of sending a data signal to said microprocessor along one of said transmission lines in response to the occurrence of an event which calls for initiation of the function, the function comprising an on-line function occurring in the meter or in the eternal device.

8. In a method according to claim 7 the improvement including the steps of providing a listen line, a talk line, and a data line, sending a periodic signal along the listen line to determine if an event has occurred, and employing said talk line for enabling data transmissing on the data line in response to detection of an event.

9. In a method according to claim 8 the improvement wherein said data line is connected to the external device, said microprocessor detecting the occurrence of the event and sending a signal through the data line to operate the external device.

10. In a method according to claim 8 the improvement wherein an additional external device is connected in series with the at least one device, and including the step of blocking the signal along the listen line to said additional external device if an event has occurred which requires operation of the at least one device.

* * * * *